United States Patent
Jeong et al.

(10) Patent No.: US 7,450,661 B2
(45) Date of Patent: Nov. 11, 2008

(54) SPACE-TIME CODING METHOD AND APPARATUS IN A MOBILE COMMUNICATION SYSTEM

(75) Inventors: Hong-Sil Jeong, Pohang-si (KR); Sung-Eun Park, Suwon-si (KR); Jae-Yoel Kim, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 708 days.

(21) Appl. No.: 10/838,005

(22) Filed: May 3, 2004

(65) Prior Publication Data
US 2004/0218690 A1 Nov. 4, 2004

(30) Foreign Application Priority Data
May 2, 2003 (KR) .............................. 2003-28111

(51) Int. Cl.
*H04L 27/00* (2006.01)
(52) U.S. Cl. ................... 375/299; 375/267; 375/347; 455/132; 455/101
(58) Field of Classification Search ............... 375/299, 375/267, 347; 455/101, 132
See application file for complete search history.

(56) References Cited

U.S. PATENT DOCUMENTS

| 6,115,427 | A  | * | 9/2000  | Calderbank et al. | 375/267 |
| 6,678,263 | B1 | * | 1/2004  | Hammons et al.    | 370/342 |
| 6,891,897 | B1 | * | 5/2005  | Bevan et al.      | 375/265 |
| 2003/0198282 | A1 | * | 10/2003 | Tujkovic et al.   | 375/146 |
| 2004/0052315 | A1 | * | 3/2004  | Thielecke et al.  | 375/299 |
| 2004/0057530 | A1 | * | 3/2004  | Tarokh et al.     | 375/267 |
| 2004/0165675 | A1 | * | 8/2004  | Ito et al.        | 375/267 |
| 2004/0223555 | A1 | * | 11/2004 | Whang et al.      | 375/267 |
| 2005/0031050 | A1 | * | 2/2005  | Kim et al.        | 375/267 |
| 2005/0068909 | A1 | * | 3/2005  | Chae et al.       | 370/278 |

* cited by examiner

*Primary Examiner*—Juan A Torres
(74) *Attorney, Agent, or Firm*—The Farrell Law Firm, PC

(57) ABSTRACT

Disclosed is a space-time coding apparatus in a mobile communication system. The space-time coding apparatus includes a de-mapper for converting a non-binary symbol into a stream of m×a binary bits, and transmits the stream of binary bits output from the de-mapper via a plurality of antennas. The number of the antennas is m, and a distributor separately distributes the m×a binary bits to the m antennas.

8 Claims, 7 Drawing Sheets

SPACE-TIME CODING METHOD AND APPARATUS IN A MOBILE COMMUNICATION SYSTEM

PRIORITY

This application claims priority under 35 U.S.C. § 119 to an application entitled "Space-Time Coding Method and Apparatus in a Mobile Communication System" filed in the Korean Intellectual Property Office on May 2, 2003 and assigned Ser. No. 2003-28111, the contents of which are incorporated herein by reference.

BACKGROUND OF THE INVENTION

1. Field of the Invention

The present invention relates generally to a space-time coding apparatus and method in a mobile communication system, and in particular, to a space-time coding apparatus and method using a non-binary coding technique.

2. Description of the Related Art

In communication systems, it is very important to efficiently and reliably transmit data over a channel. In a next generation mobile communication system being recently developed, it is necessary to increase system efficiency by using an appropriate channel coding technique in order to support high-speed communication services capable of processing and transmitting various information such as image and radio data, which has evolved from an early voice-oriented service.

However, unlike a wired channel environment, a wireless channel environment existing in a mobile communication system suffers from information loss due to inevitable errors occurring because of multipath interference, shadowing, wave attenuation, time-varying noise, interference, fading, and the like. The information loss causes serious distortion after actual signal transmission, resulting in deterioration in the overall system performance. Generally, in order to reduce the information loss, various error control techniques are used according to channel characteristics to increase system reliability, and among the error control techniques, the most typical technique is a technique using an error correction code. The error correction code includes a Reed-Solomon code, a convolutional code, and a turbo code.

In order to resolve communication instability problems due to fading, diversity techniques are used, and space diversity technology, which is a typical diversity technique uses multiple antennas. The space diversity technology is classified into a reception antenna diversity technique employing multiple reception antennas, a transmission antenna diversity technique employing multiple transmission antennas, and a multiple-input multiple-output (MIMO) technique employing multiple reception antennas and multiple transmission antennas. A space-time coding (STC) technology is a type of MIMO technique, and in the STC technology, a signal encoded in a predetermined coding technique is transmitted via multiple transmission antennas to extend the coding technology from a time domain to a space domain, thereby achieving a low error rate. With reference to FIG. 1, a description will now be made of a structure of a transceiver using the STC technology (hereinafter referred to as an "STC transceiver") for a mobile communication system.

FIG. 1 is a diagram schematically illustrating a structure of a general STC transceiver. As illustrated in FIG. 1, the STC transmitter is comprised of an STC encoder 100 and a plurality of transmission antennas 110 to 114 for transmitting signals output from the STC encoder 100, and the STC receiver includes a plurality of reception antennas 120 to 124 each receiving signals transmitted from the transmission antennas 110 to 114, and an STC decoder 102.

The STC encoder 100 encodes input information data according to a given code rate. If the number of bits of the input information data is K and the number of bits constituting a symbol output from the STC encoder 100 is N, the code rate is K/N. That is, the rate=K/N and STC encoder 100 receives K-bit information data and outputs an N-bit symbol. Symbols output from the STC encoder 100 are sequentially transmitted via the multiple transmission antennas 110 to 114.

The multiple reception antennas 120 to 124 each receive symbols transmitted from the multiple transmission antennas 110 to 114. That is, the reception antenna 120 receives symbols transmitted via the transmission antennas 110 to 114, the reception antenna 122 receives symbols transmitted via the transmission antennas 110 to 114, and in this manner, the last reception antenna 124 receives symbols transmitted via the transmission antennas 110 to 114.

The STC decoder 102 decodes the symbols received via each of the multiple reception antennas 120 to 124 according to a predetermined decode rate. The decode rate of the STC decoder 102 is determined according to the code rate of the STC encoder 100. That is, if the code rate of the STC encoder 100 is K/N, the decode rate of the STC decoder 102 is given as N/K. The STC decoder 102 decodes the received symbols to output the signals transmitted from the transmission antennas 110 to 114. Therefore, a system with a low error rate can be implemented depending on how to design the STC encoder 100, and in this way, it is possible to increase system reliability.

FIG. 2 is a diagram schematically illustrating a structure of a general STC transmitter using a turbo code. Herein, the STC transmitter using a turbo code will be referred to as a "turbo STC transmitter," and it is assumed that a code rate of the turbo STC transmitter is ⅓. The turbo STC transmitter is comprised of a first constituent encoder 200, an interleaver 202, a second constituent encoder 204, and a plurality of, for example, 3 transmission antennas 206 to 210.

When information data is received, the received information data is forwarded to the first constituent encoder 200 and the interleaver 202. The turbo interleaver 202 interleaves the received information data according to a predetermined interleaving rule and outputs the interleaved information data to the second constituent encoder 204. The first constituent encoder 200 encodes the received information data according to a predetermined coding technique, and the second constituent encoder 204 encodes the interleaved information data according to a predetermined encoding technique. The received information data, or a systematic symbol S, is transmitted, as it is, to a reception side via the transmission antenna 206. An output signal, or a first parity symbol P1, of the first constituent encoder 200 is transmitted to the reception side via the transmission antenna 208. An output signal, or a second parity symbol P2, of the second constituent encoder 204 is transmitted to the reception side via the transmission antenna 210. In a conventional non-STC mobile communication system, the systematic symbol S, the first parity symbol P1 and the second parity symbol P2 are added up by a separate adder and then transmitted to the reception side via one transmission antenna. However, in the STC transmitter using multiple transmission antennas, the systematic symbol S, the first parity symbol P1 and the second parity symbol P2 are separately transmitted via different transmission antennas.

FIG. 3 is a diagram schematically illustrating a structure of a turbo STC receiver matched to the turbo STC transmitter of FIG. 2. Signals, or symbol streams, transmitted via multiple transmission antennas of the turbo STC transmitter are received at the turbo STC receiver via its reception antenna. Here, the turbo STC receiver can have either one reception antenna or multiple reception antennas. For example, if the number of reception antennas of the turbo STC receiver is 3, each of the 3 reception antennas receives symbol streams transmitted from the 3 transmission antennas of the turbo STC transmitter.

As illustrated in FIG. 3, the turbo STC receiver is comprised of two constituent decoders, a first constituent decoder 300 and a second constituent decoder 306, two deinterleavers 302 and 304, and an interleaver 308. A signal transmitted from the turbo STC transmitter is forwarded to the first constituent decoder 300 and the deinterleaver 304. The first constituent decoder 300 performs a decoding operation only on the first parity symbol P1, or a symbol transmitted via the transmission antenna 208. A signal output from the first constituent decoder 300 is input to the deinterleaver 302. The deinterleaver 302 receives the signal output from the first constituent decoder 300, deinterleaves the received signal according to the interleaving rule employed in the interleaver 202, and outputs the deinterleaved signal to the second constituent decoder 306.

The deinterleaver 304 receives the second parity symbol P2, or a signal transmitted via the transmission antenna 210. The deinterleaver 304 deinterleaves the received signal according to the interleaving rule employed in the interleaver 202, and outputs the deinterleaved signal to the second constituent decoder 306. The second constituent decoder 306 decodes the signals received from the deinterleaver 304 and the deinterleaver 302, and outputs the decoded signals to the interleaver 308. The interleaver 308 interleaves the signal output from the second constituent decoder 306 according to the interleaving rule employed in the interleaver 202, and outputs the interleaved signal to the first constituent decoder 300. By repeatedly performing the decoding process, i.e., through an iterative decoding operation, the turbo STC receiver can correctly decode a signal transmitted from the transmitter.

As described above, in the STC technology in which the transmission side uses a plurality of transmission antennas, if a signal transmitted via a particular one of the transmission antennas suffers from distortion, data transmitted by the transmission side is decoded using signals transmitted from other transmission antennas with the exception of the particular transmission antenna. For example, in a system that transmits a signal using 3 transmission antennas, if a signal transmitted from a particular one of the 3 transmission antennas suffers from distortion, the reception side decodes the signal transmitted from the transmission side using signals transmitted from the other 2 transmission antennas which have not suffered from distortion. In this case, the decoding efficiency is lower than when the signal transmitted from the transmission side is decoded using signals transmitted from the 3 transmission antennas.

Meanwhile, a hybrid automatic retransmission request (HARQ) scheme is used to perform retransmission when an error has occurred in a received signal. The HARQ scheme requests retransmission until no error occurs in the received signal, to thereby implement a high-reliability communication system. The HARQ scheme employs a soft combining technique in order to increase efficiency, and in the soft combining technique, the reception side temporarily stores defective data in a soft buffer and later, combines the stored defective data with corresponding retransmitted data, thereby reducing an error rate. The soft combining technique is classified into a chase combining (CC) technique and an incremental redundancy (IR) technique. In the CC technique, the transmission side uses the same format for both initial transmission and retransmission, and in the IR technique, the transmission side uses different formats for initial transmission and retransmission. In the IR technique, when n-bit user data is channel-coded into m symbols, the transmission side transmits only some of the m symbols at initial transmission, and then sequentially transmits the remaining symbols at retransmission. That is, the initial transmission is different from the retransmission in coding rate. In response, the reception side attaches the retransmitted symbols to the rear of the initially-transmitted symbols to construct high-coding rate symbols, and then performs error correction on the combined symbols.

As described above, in the IR technique, the turbo STC transmitter transmits only some of transmission symbols by employing a puncturing technique. For example, if the HARQ scheme is applied to the turbo STC transmitter, the signal output from the first constituent encoder 200 is not transmitted for an even time period and the signal output from the second constituent encoder 204 is not transmitted for an odd time period. That is, for the received information data, the turbo STC transmitter transmits one parity symbol rather than two parity symbols. The IR-based HARQ scheme is not suitable for a system that transmits a signal using three or more transmission antennas, because two symbols, or bit streams, are transmitted at a particular time slot in the IR-based HARQ scheme. In addition, because the signals transmitted via the multiple transmission antennas as shown in FIG. 2 are transmitted via independent paths, there is no cross correlation between the signals transmitted via the multiple transmission antennas. Therefore, if an error occurs in a signal transmitted via a particular one of the multiple transmission antennas, the reception side has low decoding performance for the signal transmitted from the transmission side.

SUMMARY OF THE INVENTION

It is, therefore, an object of the present invention to provide an apparatus and method for transmitting a signal without error by correlation between signals transmitted via multiple transmission antennas.

It is another object of the present invention to provide a space-time coding apparatus and method in a mobile communication system.

It is further another object of the present invention to provide an apparatus and method for maximizing HARQ efficiency by correlation between signals transmitted via multiple transmission antennas.

In accordance with a first aspect of the present invention, there is provided a space-time coding apparatus in a mobile communication system, the apparatus including a de-mapper for converting a non-binary symbol into a stream of m×a binary bits, and transmitting the stream of binary bits output from the de-mapper via a plurality of antennas. The apparatus comprises a distributor for separately distributing the m×a binary bits to the antennas, and the number of the antennas is m.

In accordance with a second aspect of the present invention, there is provided a method for controlling a space-time coding apparatus in a mobile communication system, the apparatus including a de-mapper for converting a non-binary symbol into a stream of m×a binary bits, and transmitting the stream of binary bits output from the de-mapper via a plurality of antennas. The method comprises separately distributing the m×a binary bits to the antennas, wherein the number of the antennas is m.

In accordance with a third aspect of the present invention, there is provided a space-time coding apparatus in a mobile communication system, the apparatus including m antennas. The apparatus comprises a mapper for mapping m×a×K binary bits into K symbols according to a predetermined mapping rule; an encoder for encoding the K symbols into N non-binary encoded symbols according to predetermined code rate and coding scheme; a de-mapper for de-mapping the N non-binary encoded symbols into m×a×N binary bits according to a de-mapping rule corresponding to the mapping rule; and a distributor for dividing the m×a×N binary bits into N bit streams, and distributing each of the N bit streams such that the m×a binary bits constituting the bit stream are sequentially transmitted via the m antennas, respectively.

In accordance with a fourth aspect of the present invention, there is provided a method for controlling a space-time coding apparatus in a mobile communication system, the apparatus including m antennas. The method comprises mapping m×a×K binary bits into K symbols according to a predetermined mapping rule; encoding the K symbols into N non-binary encoded symbols according to predetermined code rate and coding scheme; de-mapping the N non-binary encoded symbols into m×a×N binary bits according to a de-mapping rule corresponding to the mapping rule; and dividing the m×a×N binary bits into N bit streams, and distributing each of the N bit streams such that the m×a binary bits constituting the bit stream are sequentially transmitted via the m antennas, respectively.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

Figure 1:
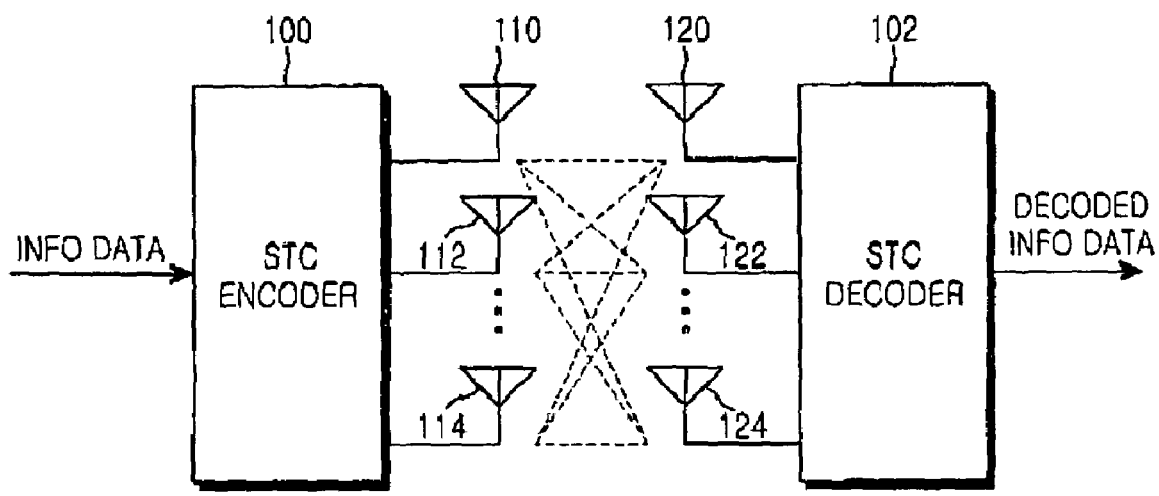
FIG. 1 is a diagram schematically illustrating a structure of a general STC transceiver.
Figure 2:
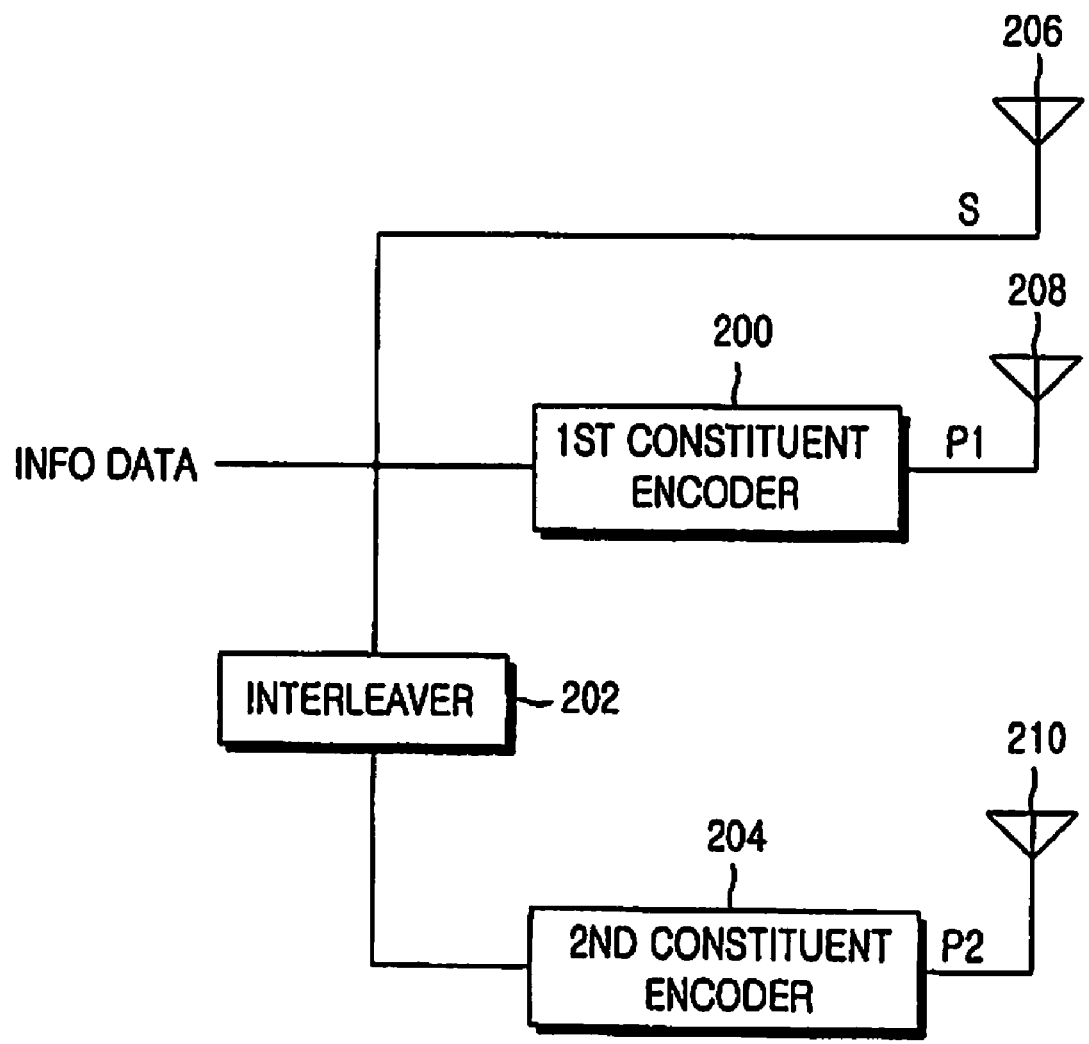
FIG. 2 is a diagram schematically illustrating a structure of a general STC transmitter using a turbo code.
Figure 3:
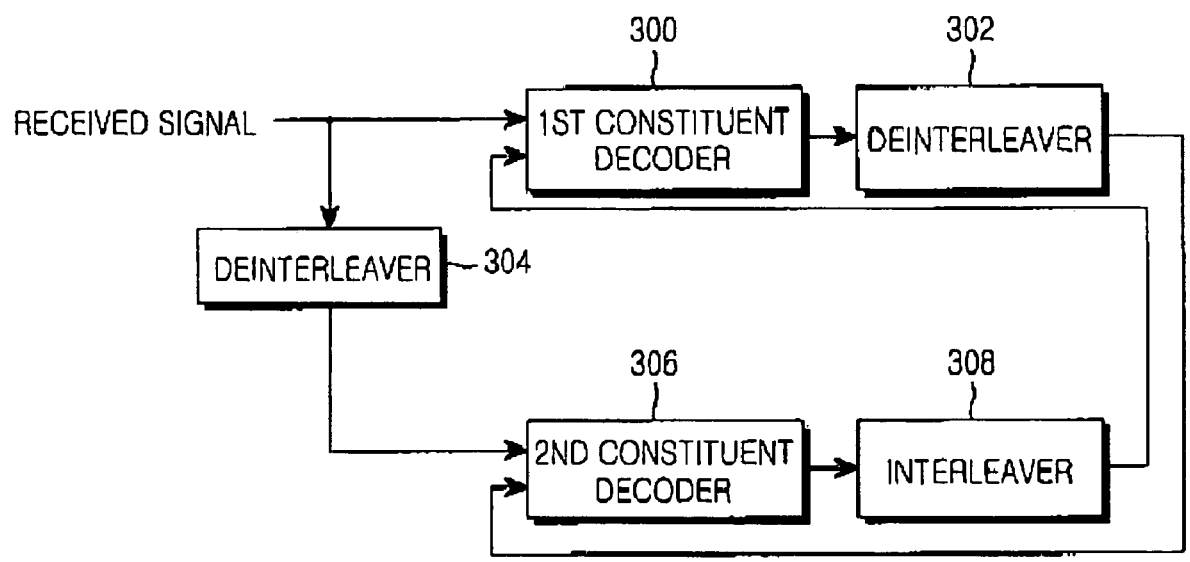
FIG. 3 is a diagram schematically illustrating a structure of a turbo STC receiver matched to the turbo STC transmitter of FIG. 2.
Figure 4:
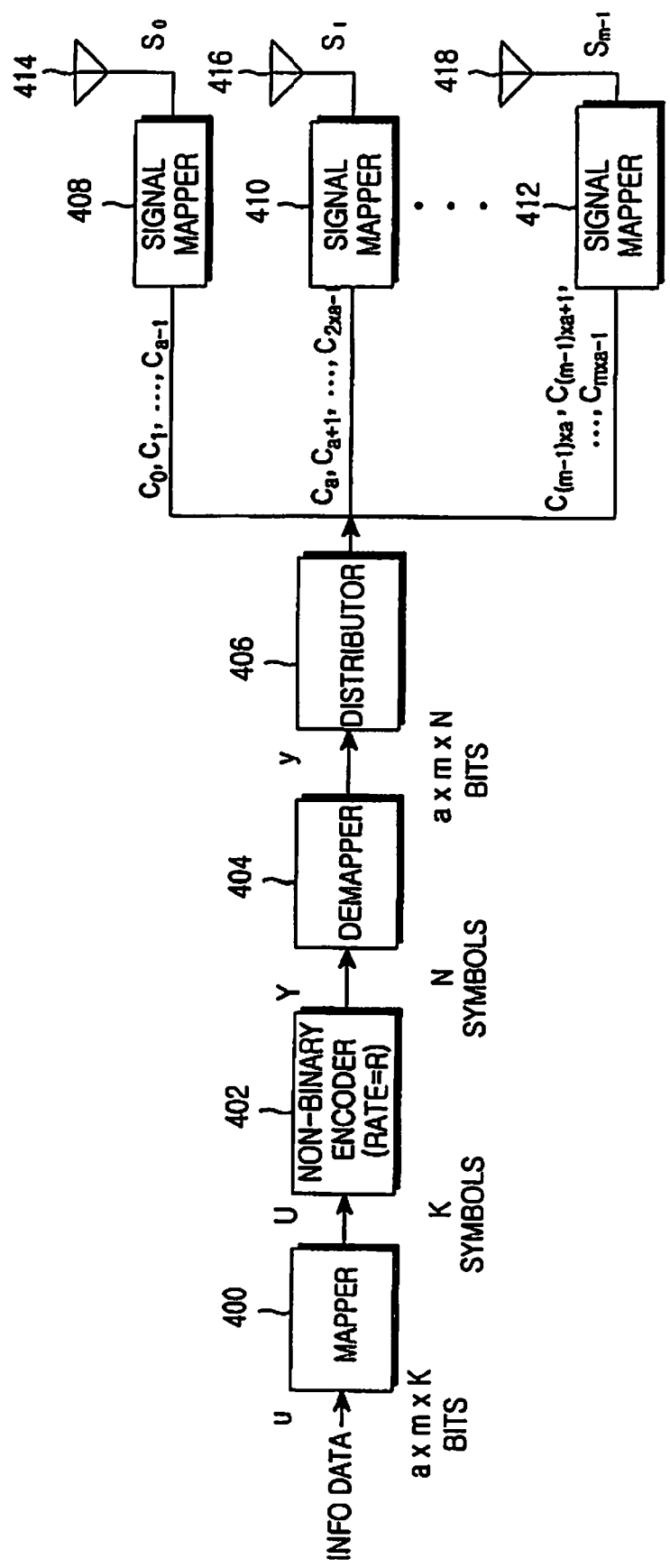
FIG. 4 is a diagram schematically illustrating a structure of an STC transmitter using a non-binary code according to an embodiment of the present invention.

FIG. 4 is a diagram schematically illustrating a structure of an STC transmitter using a non-binary code according to an embodiment of the present invention. As illustrated in FIG. 4, the STC transmitter is comprised of a mapper 400, a non-binary encoder 402, a de-mapper 404, a distributor 406, a plurality of signal mappers 408 to 412, and a plurality of, for example, m transmission antennas 414 to 418.

It is assumed herein that information data is input to the mapper 400 by the frame and each frame is comprised of m×a×K bits. Here, it is assumed that the m×a×K bits constituting a frame correspond to a binary bit stream, or bits encoded by a binary coding technique, for example, a turbo coding technique. In an embodiment of the present invention, the binary bit streams are converted into non-binary bit streams and then transmitted via a plurality of transmission antennas so that they do not overlap with each other, thereby increasing a correlation between signals transmitted via the multiple transmission antennas, contributing to reliable communication. Therefore, in the embodiment of the present invention, a Galois field (GF) is used to convert the binary bit stream into a non-binary bit stream. Although the embodiment of the present invention will be described herein with reference to a method of converting the binary bit stream into the non-binary bit stream using the Galois field, the present invention can also be applied to other methods of converting the binary bit stream into the non-binary bit stream.

The mapper 400 generates K symbols with the m×a×K bits on the Galois field, and the generated K symbols are represented by $U_0, U_1, U_2, \ldots, U_{K-1}$. The K symbols output from the mapper 400 are input to the non-binary encoder 402. A code rate of the non-binary encoder 402 is determined taking a data rate of the STC transmitter into account. If it is assumed that the code rate of the non-binary encoder 402 is R, the data rate becomes R×m. Therefore, in order to obtain a maximum data rate, a value of R must be set such that a condition of R=1/m is satisfied. For example, for m=3, a=1, the value for R for a maximum data rate is set to ⅓. The non-binary encoder 402 receives K symbols output from the mapper 400, converts the K symbols into N non-binary-encoded symbols on the Galois field, and outputs the N non-binary-encoded symbols to the de-mapper 404.

The N symbols output from the non-binary encoder 402 are input to the de-mapper 404. The de-mapper 404 converts the N non-binary symbols into m×N binary bits on the Galois field, and outputs the binary bits to the distributor 406. That is, the de-mapper 404 performs a reverse operation of the mapping operation performed in the mapper 400. A detailed description will now be made of an operation of the de-mapper 404.

Assuming that the N non-binary symbols input to the de-mapper 404 are $Y_0, Y_1, Y_2, \ldots, Y_{N-1}$, the de-mapper 404 converts the N binary symbols into m×N binary bits on the Galois field. A description will now be made of a Galois field $GF(2^{m \times a})$ where m=3, a=1, by way of example. In the Galois field $GF(2^{m \times a})$, m=3, a=1 means that one non-binary symbol is converted into 3 binary bits. Shown in Table 1 below is a conversion rule in which a non-binary symbol is converted into binary bits on the Galois field.

TABLE 1

| $y_{3i}, y_{3i+1}, y_{3i+2}$ | Expression in addition | Expression in multiplication |
| --- | --- | --- |
| 000 | 0 | 0 |
| 100 | 1 | $1 = \alpha^7$ |
| 010 | $\alpha$ | $\alpha$ |
| 110 | $1 + \alpha$ | $\alpha^3$ |
| 001 | $\alpha^2$ | $\alpha^2$ |
| 101 | $1 + \alpha^2$ | $\alpha^6$ |
| 011 | $\alpha + \alpha^2$ | $\alpha^4$ |
| 111 | $1 + \alpha + \alpha^2$ | $\alpha^5$ |

Whether non-binary symbols input to the de-mapper 404 are expressed in the form of addition or multiplication as shown in Table 1 is determined according to its expression in the mapper 400. For example, if the mapper 400 has converted binary bits into symbols having non-binary bits in the form of multiplication, the de-mapper 404 also converts the symbols having non-binary bits into binary bits in the form of multiplication. In contrast, if the mapper 400 has converted binary bits into symbols having non-binary bits in the form of addition, the de-mapper 404 also converts the symbols having non-binary bits into binary bits in the form of addition. In the following description, it will be assumed that the symbols having non-binary bits being input to the de-mapper 404 are converted into binary bits by expression of addition (vector expression). However, it would be obvious to those skilled in the art that the symbols having non-binary bits being input to the de-mapper 404 can also be converted into binary bits by expression of multiplication.

A description will now be made of a process of converting the multiplication expression into the addition expression. A generator polynomial in a mobile communication system using a Galois field $G(2^3)$ is defined in Equation (1) as:

$$f(x)=x^2+x+1 \quad (1)$$

In Equation (1), f(x) denotes a primitive polynomial in the Galois field $GF(2^3)$, and when $\alpha$ is a primitive element in the Galois field $GF(2^3)$, the following expression is satisfied.

$$f(\alpha)=0 \quad (2)$$

Therefore, the generator polynomial of Equation (1) can be expressed as $\alpha^3+\alpha+1=0$. Also, the generator polynomial can be expressed as $\alpha^3=\alpha+1$. A particular symbol can be expressed as a linear combination of 1, $\alpha$ and $\alpha^2$, using the expression of $\alpha^3=\alpha+1$. That is, $\alpha^4(011)$ is expressed in Equation (3) as:

$$\alpha^4=\alpha\alpha^3=\alpha(\alpha+1)=\alpha^2+\alpha \quad (3)$$

In this manner, it is possible to convert the multiplication expression into the addition expression. The converted addition expression has been described in connection with Table 1. That is, the de-mapper 404 can convert symbols having non-binary bits into 3 binary bits $y_0y_1y_2$ by the Galois field $GF(2^3)$ as shown in Table 1. Therefore, the de-mapper 404 outputs an m×a×N-bit binary bit stream.

The m×a×N-bit binary bit stream output from the de-mapper 404 is input to the distributor 406. The distributor 406 divides the received binary bit stream into N m×a-bit symbols. Each of the N symbols has m bits of $c_0, c_1, \ldots, c_{m\times a-1}$. The distributor 406 forwards a bit $c_0, c_1, \ldots, c_{a-1}$ constituting each of the N symbols to the signal mapper 408. The bit $c_0, c_1, \ldots, c_{a-1}$ indicates a bits from a first to ath bit among the m×a bits constituting each of the N symbols. That is, each of the N symbols is comprised of m×a bits of $c_0$ to $c_{m\times a}$. As a result, when one binary bit stream is input to the distributor 406, the signal mapper 408 is provided with N×a binary bits. Similarly, the distributor 406 provides a bit $c_a, c_{a+}1, \ldots, c_{2\times a-1}$ constituting each of the N symbols to the signal mapper 410. As a result, when one binary bit stream is input to the distributor 406, the signal mapper 410 is also provided with N×a binary bits. In the same manner, the distributor 406 provides the last bits $c_{(m-1)\times a}, c_{(m-1)\times a+}1, \ldots, c_{m\times a-1}$ constituting each of the N symbols to the signal mapper 412. As a result, when one binary bit stream is input to the distributor 406, the signal mapper 412 is also provided with N×a binary bits.

The operation of the de-mapper 404 as stated above may also be described as follows. The m×a×N-bit binary bit stream output from the de-mapper 404 is input to the distributor 406. The distributor 406 divides the received binary bit stream into N m×a-bit symbols. Each of the N symbols has m×a bits of $(c_0, c_1, \ldots, c_{m\times a-1})$. The distributor 406 forwards bits $(c_0, c_m, \ldots, c_{(a-1)\times m})$ constituting each of the N symbols to the signal mapper 408. The bits $(c_0, c_m, \ldots, c_{(a-1)\times m})$ indicate a first bit to a m×i(i=1, \ldots, a-1) time bit among the m×a bits constituting each of the N symbols. Each of the N symbols is comprised of m×a bits of $c_0$ to $c_{(a-1)\times m}$. As a result, when one binary bit stream is input to the distributor 406, the signal mapper 408 is provided with N×a binary bits. Also, the distributor 406 provides bits $(c_1, c_{m+1}, \ldots, c_{(a-1)\times m+1})$ constituting each of the N symbols to the signal mapper 410. As a result, when one binary bit stream is input to the distributor 406, the signal mapper 410 is also provided with N×a binary bits. In the same manner, the distributor 406 provides the last bits $(c_{(m-1)}, c_{m\times 2-1}, \ldots, c_{m\times a-1})$ constituting each of the N symbols to the signal mapper 412. As a result, when one binary bit stream is input to the distributor 406, the signal mapper 412 is also provided with N×a binary bits.

By providing multiple binary bits for one non-binary symbol being input to the de-mapper 404 to the multiple signal mappers 408 to 412 by a bits as described above, a correlation between binary bits constituting the non-binary symbol is increased. That is, an error rate during transmission is decreased by transmitting multiple binary bits that can be converted into one non-binary symbol via multiple transmission antennas.

Each of the signal mappers 408 to 412 signal-maps bits received from the distributor 406 in a predetermined signal mapping method, and then outputs the signal-mapped bit to its associated antenna. That is, the signal mapper 408 determines a signal to be transmitted via the transmission antenna 414 in a constellation corresponding to a set of bits received from the distributor 406. The constellation is changed according to the number of n bits. For example, if a value of n is 1, the constellation can be implemented with binary phase shift keying (BPSK) in which its phase is mapped to a transmission signal using a carrier having constant amplitude and frequency, and if a value of n is 2, the constellation can be implemented with quadrature phase shift keying (QPSK). Further, if a value of n is 3, the constellation can be implemented with 8-ary phase shift keying (8PSK). Herein, a signal output from the signal mapper 408 is called $S_0$, a signal output from the signal mapper 410 is called $S_1$, and in this manner, a signal output from the last signal mapper 412 is called $S_{m-1}$.

The signal $S_0$ output from the signal mapper 408 is transmitted via the transmission antenna 414, and the signal $S_1$ output from the signal mapper 410 is transmitted via the transmission antenna 416. In this manner, the signal $S_{m-1}$ output from the last signal mapper 412 is transmitted via the transmission antenna 418.

The number of transmission antennas 414 to 418 is related to the number of binary bits constituting one non-binary symbol output from the de-mapper 404. That is, in the embodiment of the present invention, one non-binary symbol input to the de-mapper 404 is converted into m×a bits. Therefore, the number of the transmission antennas 414 to 418 is m. That is, by transmitting a signal using the m transmission antennas 414 to 418, a high diversity gain can be obtained and a data rate R×m can also be increased to a maximum of 1.

The STC technology will be described with reference to the mapper 400 and the de-mapper 404. For the convenience, it will be assumed herein that the number m of transmission antennas is 3 (m=3), a=1 and a code rate R is ⅓ (R=⅓). When a 12-bit signal of 011001100101 is input to the mapper 400, the 12-bit signal of 011001100101 is converted into 4 bit streams of 011, 001, 100 and 101. The mapper 400 sequentially receives the 4 bit streams, i.e., sequentially receives the 12-bit signal in increments of 3 bits, converts the received bit streams into $\alpha^4, \alpha^2, 1, \alpha^6$ by the Galois field GF($2^3$), and outputs the result to the non-binary encoder 402. The non-binary encoder 402 non-binary-encodes a signal output from the mapper 400 according to a predetermined code rate, i.e., a code rate of ⅓, and outputs $\alpha, \alpha^3, \alpha^4, \alpha^2, 1, \alpha^6, \alpha^5, \alpha^4, \alpha^5, \alpha^6, \alpha^4, \alpha^3$ to the de-mapper 404. The de-mapper 404 de-maps the received non-binary symbols into binary bits according to the mapping rule employed in the mapper 400, and outputs the binary bits to the distributor 406. The binary bits output from the de-mapper 404 are 010, 110, 011, 001, 100, 101, 111, 011, 111, 101, 011, 110. The distributor 406 distributes the binary bits received from the de-mapper 404 according to the transmission antennas. Here, it is assumed that three bits output from the de-mapper 404 constitute one symbol. That is, the distributor 406 provides first bits among three bits constituting each of 12 symbols to the signal mapper 408, provides second bits among the three bits constituting each of the 12 symbols to the signal mapper 410, and provides third bits among the three bits constituting each of the 12 symbols to the signal mapper 412. Therefore, $c_0$=0 1 0 0 1 1 1 0 1 1 0 1 is input to the signal mapper 408, $c_1$=1 1 0 0 0 1 1 1 0 1 1 is input to the signal mapper 410, and $c_{m-1}$=0 0 1 1 0 1 1 1 1 1 1 0 is input to the signal mapper 412. If a constellation of the signal mappers 408 to 412 is BPSK, '0' is mapped to '1' and '1' is mapped to '−1'. Therefore, $s_0$=1 −1 1 −1 −1 −1 −1 −1 1 −1 −1 1 −1 is transmitted via the transmission antenna 414, $s_1$=−1 −1 −1 1 1 1 −1 −1 −1 1 −1 −1 is transmitted via the transmission antenna 416, and $s_{m-1}$=1 1 −1 −1 −1 −1 −1 −1 −1 −1 −1 1 is transmitted via the transmission antenna 418.

Figure 5:
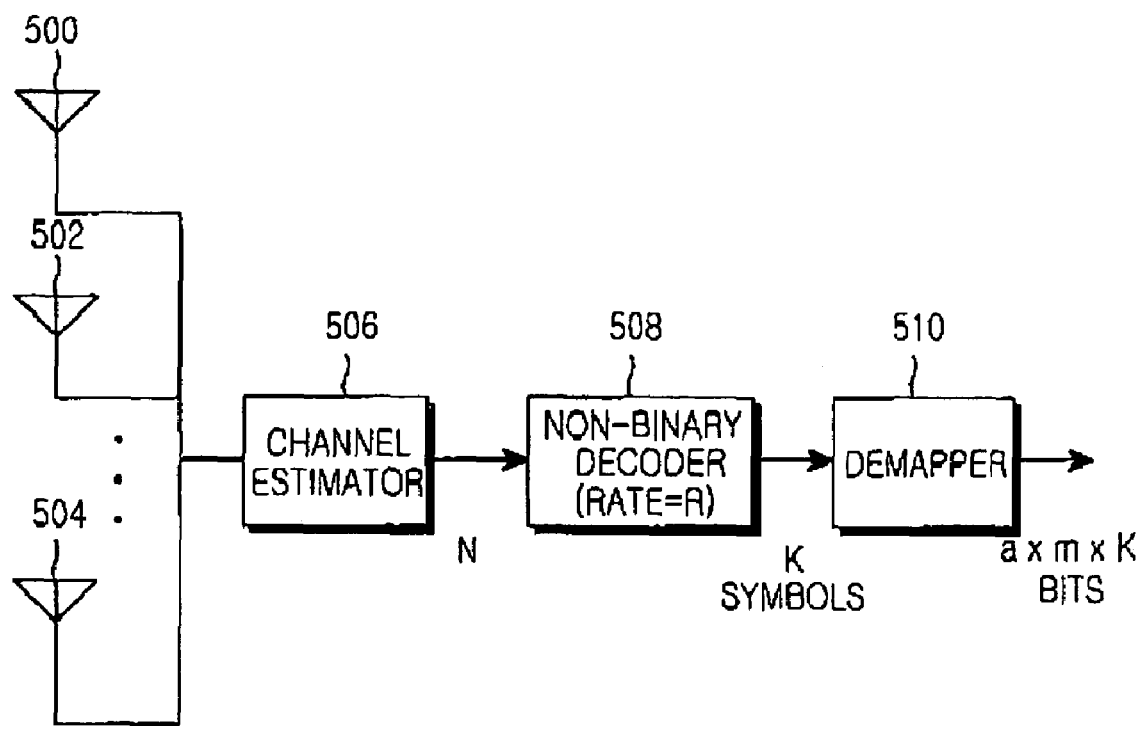
FIG. 5 is a diagram schematically illustrating a structure of an STC receiver using a non-binary code according to an embodiment of the present invention.

FIG. 5 is a diagram schematically illustrating a structure of an STC receiver using a non-binary code according to an embodiment of the present invention. Referring to FIG. 5, the STC receiver is comprised of a plurality of reception antennas 500 to 504, a channel estimator 506, a non-binary decoder 508, and a de-mapper 510. Signals received via the multiple reception antennas 500 to 504 are provided to the channel estimator 506, and the channel estimator 506 performs channel estimation on a corresponding transmission channel. An operation in the channel estimator 506 is variable according to the non-binary encoding/decoding technique. The received signals (expressed as N symbols in FIG. 5 for the convenience of explanation) channel-estimated by the channel estimator 506 are input to the non-binary decoder 508. A structure of the non-binary decoder 508 depends upon the structure of the non-binary encoder 402. The non-binary decoder 508 converts the received N symbols into K symbols according to a predetermined decode rate, and outputs the K symbols to the de-mapper 510. A de-mapping operation in the de-mapper 510 is identical to the operation performed in the de-mapper 404 of FIG. 4. That is, the de-mapper 510 converts the received K symbols having non-binary bits into a×m×K binary bits, thereby decoding the information data transmitted from the STC transmitter.

Figure 6:
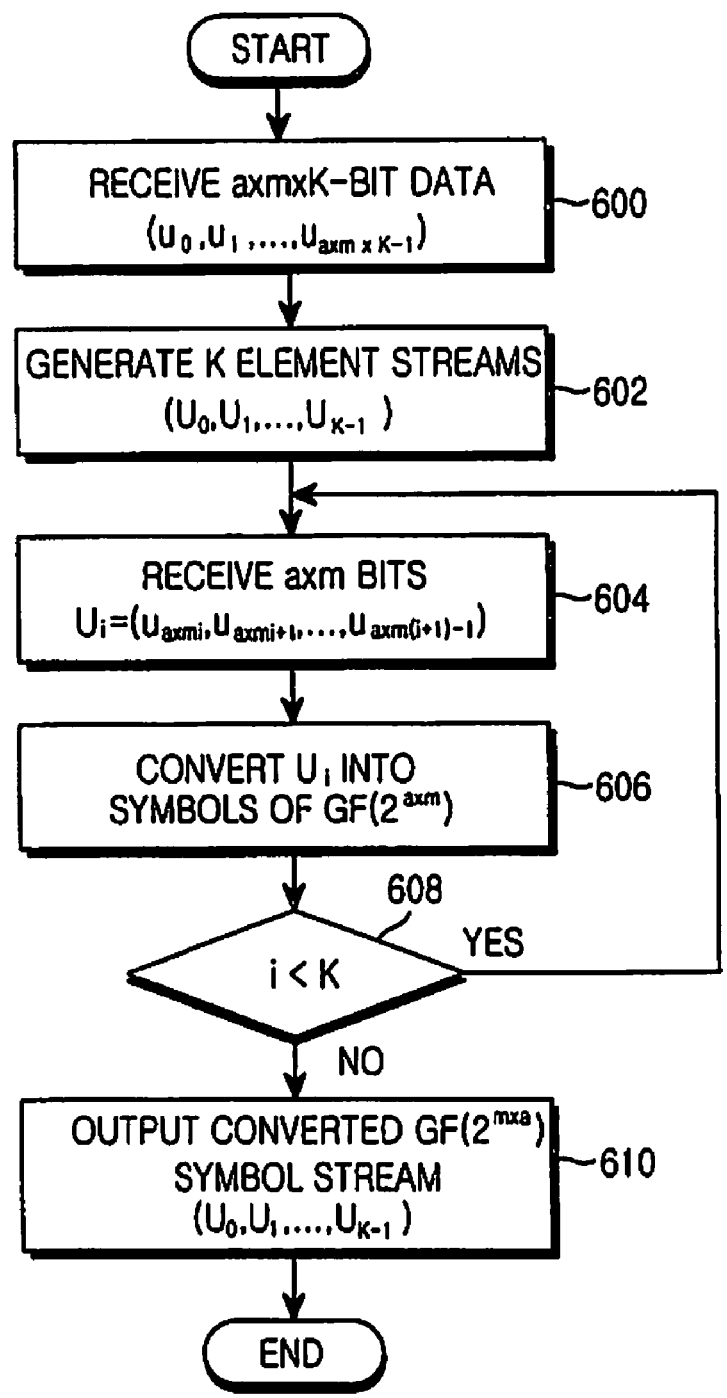
FIG. 6 is a flowchart illustrating an operating procedure of the mapper shown in FIG. 4.

FIG. 6 is a flowchart illustrating an operating procedure of the mapper 400 shown in FIG. 4. Referring to FIG. 6, in step 600, the mapper 400 receives a×m×K-bit information data, and then proceeds to step 602. It is assumed that the a×m×K bits are $u_0, u_1, u_2, \ldots, u_{a \times m \times K-1}$. In step 602, the mapper 400 generates K element streams as it receives the a×m×K bits, and then proceeds to step 604. It is assumed that the K element streams are $U_0, U_1, U_2, \ldots, U_{K-1}$. In step 604, the mapper 400 sequentially maps the received a×m×K bits from a first element stream of the generated K element streams $U_0, U_1, U_2, \ldots, U_{K-1}$ by a×m bits, and then proceeds to step 606. In step 606, the mapper 400 converts the K element streams $U_0, U_1, U_2, \ldots, U_{K-1}$ into symbols having non-binary bits by the Galois field, and then proceeds to step 608. In step 608, the mapper 400 determines whether all of the received a×m×K bits have been converted into symbols having non-binary bits by the Galois field. If it is determined that all the received binary bits have been converted into symbols having non-binary bits by the Galois field, the mapper 400 proceeds to step 610. Otherwise, if it is determined that all the received binary bits have not been converted into symbols having non-binary bits by the Galois field, the mapper 400 returns to step 604. In step 610, the mapper 400 outputs symbols $U_0, U_1, U_2, \ldots, U_{K-1}$ having the converted non-binary bits.

Figure 7:
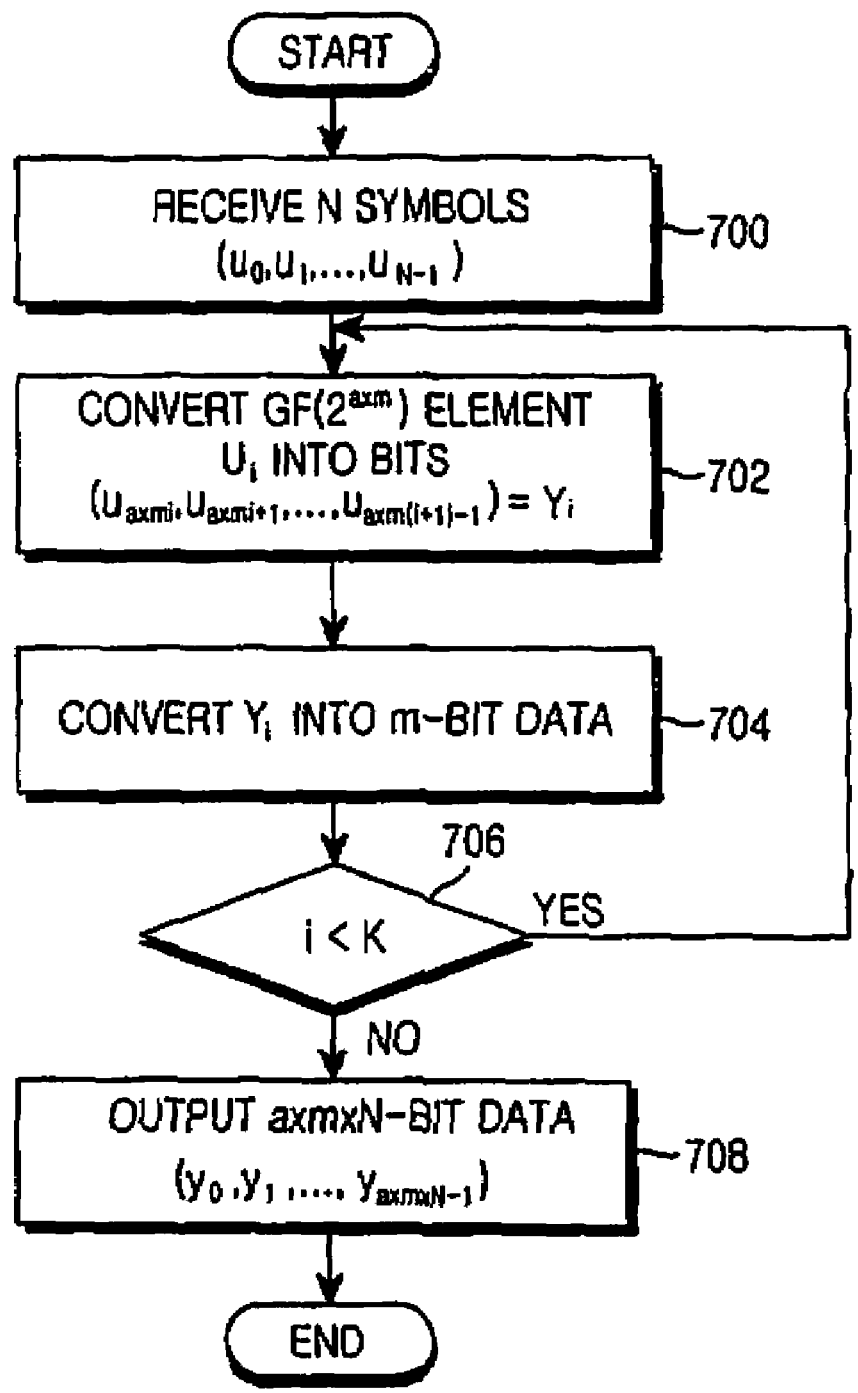
FIG. 7 is a flowchart illustrating an operating procedure of the de-mapper shown in FIG. 5.

FIG. 7 is a flowchart illustrating an operating procedure of the de-mapper 510 shown in FIG. 5. Referring to FIG. 7, in step 700, the de-mapper 510 receives N symbols having non-binary bits, and then proceeds to step 702. It is assumed herein that the N symbols comprised of non-binary bits are $Y_0, Y_1, Y_2, \ldots, Y_{N-1}$. In step 702, the de-mapper 510 determines the number of binary bits into which it will convert the received non-binary symbol $Y_i$, and then proceeds to step 704. In step 704, the de-mapper 510 converts the non-binary symbol $Y_i$ into binary bits according to the number of binary bits determined in step 702, and then proceeds to step 706.

In step 706, the de-mapper 510 determines whether all the received N symbols have been converted into binary bits by the Galois field. If it is determined that all the received non-binary bit symbols have been converted into binary bits by the Galois field, the de-mapper 510 proceeds to step 708. Otherwise, if it is determined that all the received non-binary bit symbols have not been converted into binary bits by the Galois field, the de-mapper 510 returns to step 702. In step 708, the de-mapper 510 outputs converted non-binary bits $y_0, y_1, y_2, \ldots, y_{a \times m \times N-1}$.

As understood from the foregoing description, the present invention can transmit data without error by increasing a correlation between bit streams transmitted by multiple antennas. In addition, the present invention maximizes antenna diversity using multiple antennas, and correctly decodes data received by antenna diversity, thereby securing high reliability.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A space-time coding apparatus in a mobile communication system, the apparatus including m antennas, the apparatus comprising:
   a mapper for mapping a×m×K binary bits into K symbols according to a predetermined mapping rule;
   an encoder for encoding the K symbols into N non-binary encoded symbols according to a predetermined code rate and coding scheme;
   a de-mapper for de-mapping the N non-binary encoded symbols into a×m×N binary bits according to a de-mapping rule corresponding to the mapping rule; and
   a distributor for dividing the a×m×N binary bits into N bit streams, and distributing each of the N bit streams such that the a×m binary bits constituting the bit stream are sequentially transmitted via the m antennas, respectively.

2. The space-time coding apparatus of claim 1, further comprising m signal mappers each of which maps binary bits distributed by the distributor into a modulation symbol according to a predetermined constellation and transmits the modulation symbol via a corresponding antenna.

3. The space-time coding apparatus of claim 1, wherein the mapper maps the a×m×K binary bits into the K symbols on a Galois field.

4. The space-time coding apparatus of claim 1, wherein the de-mapper de-maps the N non-binary encoded symbols into the a×m×N binary bits on a Galois field.

5. A method for controlling a space-time coding apparatus in a mobile communication system, the apparatus including m antennas, the method comprising the steps of:
   mapping a×m×K binary bits into K symbols according to a predetermined mapping rule;
   encoding the K symbols into N non-binary encoded symbols according to a predetermined code rate and coding scheme;
   de-mapping the N non-binary encoded symbols into a×m×N binary bits according to a de-mapping rule corresponding to the mapping rule; and
   dividing the a×m×N binary bits into N bit streams, and distributing each of the N bit streams such that the a×m binary bits constituting the bit stream are sequentially transmitted via the m antennas, respectively.

6. The method of claim 5, further comprising the step of mapping binary bits distributed separately to the m antennas into a modulation symbol according to a predetermined constellation before transmission.

7. The method of claim 5, wherein the mapping step comprises the step of mapping the a×m×K binary bits into the K symbols on a Galois field.

8. The method of claim 5, wherein the step de-mapping comprises the step of de-mapping the N non-binary encoded symbols into the a×m×N binary bits on a Galois field.

* * * * *